United States Patent [19]

Scholtens et al.

[11] Patent Number: 4,963,299

[45] Date of Patent: Oct. 16, 1990

[54] SURFACE TREATMENT OF POLYOLEFIN OBJECTS

[75] Inventors: Boudewijn J. R. Scholtens, Sittard; Hendrikus J. J. Rutten, Maastricht, both of Netherlands

[73] Assignee: Stamicarbon B.V., Geleen, Netherlands

[21] Appl. No.: 210,905

[22] Filed: Jun. 24, 1988

[30] Foreign Application Priority Data

Jun. 26, 1987 [NL] Netherlands .......................... 8701502
Sep. 24, 1987 [NL] Netherlands .......................... 8702271

[51] Int. Cl.$^5$ ...................... B29C 71/00; B29C 71/04
[52] U.S. Cl. ..................................... 264/22; 264/204; 264/205; 264/210.4; 264/210.8; 264/211.17; 264/211.2; 264/344; 525/333.8; 525/387
[58] Field of Search ............. 264/22, 204, 205, 210.3, 264/210.4, 210.8, 211.13, 211.14, 211.17, 211.2, 340, 344; 525/333.7, 333.8, 387; 526/348.1; 528/502

[56] References Cited

U.S. PATENT DOCUMENTS 4,403,012 9/1983 Harpell et al. ...................... 428/290
4,457,985 7/1984 Harpell et al. ...................... 428/224

FOREIGN PATENT DOCUMENTS 1256649 12/1971 United Kingdom ............. 525/333.8

Primary Examiner—Jeffery Thurlow
Assistant Examiner—Leo B. Tentoni
Attorney, Agent, or Firm—Cushman, Darby & Cushman

[57] ABSTRACT

The invention relates to a process for the treatment of surfaces of highly oriented polyolefin objects, obtained by converting a solution or melt of a linear polyolefin with a weight average molecular weight of at least 400.000 g/mol, at a temperature above the dissolution temperature, respectively above the melting temperature, into a shaped object, converting this object into a gel-object by cooling, and stretching the gel-object at elevated temperature optionally after full or partial removal of the solvent, in which the surface of the object is contacted with a solution of a radical-forming compound and that the object is then exposed to a temperature of at least 30° C. for at least 1 minute.

14 Claims, No Drawings

SURFACE TREATMENT OF POLYOLEFIN OBJECTS

BACKGROUND OF THE INVENTION

The invention relates to a process for the treatment of surfaces of highly oriented polyolefin objects. It is known to prepare highly oriented polyolefin objects, such as filamens, tapes or films from a solution of a high molecular polyolefin, see for instance U.S.-A-No. 4,344,908, U.S.-A-No.-4,411,854, U.S.-A-No.-4,422,993, U.S.-A-No.-4,430,383, U.S.-A-No.-4,436,689, U.S.-A-No.-4,668,717, GB-A-2,164,897 and EP-A-181,016. According to these references a solution of a linear polyolefin with a weight average molecular weight of at least $4 \times 10^5$ g/mol is spun or extruded, the object obtained after spinning or extrusion is converted into a gel-object by cooling, and this gel-object is stretched at an elevated temperature. It is also known to prepare such objects from a melt of a polyolefin. See for instance U.S.-A-No.-4,525,564.

Polyolefins are nonpolar polymers that have been known for a long time and which can be, and are, used for a large number of purposes. A number of applications consist in combining polyolefins with other substances (or plastics), for example in multi-layer films or composites, or applying an adhesive, ink or paint layer or a coating to an object manufactured from a polyolefin. Use is often made of materials with a polar character in these applications. A problem in such applications is the nonpolarity of the polyolefins, on account of which it is very difficult to obtain good adhesion between the nonpolar polyolefin and materials that are more polar than the polyolefin, for example polar substances (or plastics), resins and metals.

Various solutions to this problem have been suggested, for example treating the polyolefin object with oxidizing liquids such as chromic acid (so-called etching) or subjecting it to a plasma
discharge treatment as described in EP-A-No. 62.491. However, these methods are complicated or expensive, while the strength and the stiffness of the polyolefin material are usually affected and, moreover, the adhesion is often unsatisfactory.

BRIEF DESCRIPTION OF THE INVENTION

The aim of the invention is to find a process for treating polyolefin surfaces to obtain good adhesion to materials of a more polar nature than the polyolefin, without the aforementioned disadvantages.

The aim of the invention is achieved by contacting the surface of the object with a solution of a radical-forming compound and then exposing the object to a temperature of at least 30° C. for at least 1 minute.

Mixing a polyolefin with a radical-forming compound (peroxide) before the polyolefin object is formed in order to obtain better adhesion is known from DE-A-No. 1719111. A disadvantage is that a relatively large amount of peroxide must be used and that the strength and stiffness of the polyolefin material are affected. In addition, this causes changes in the thermoplastic character of the polyolefin.

DETAILED DESCRIPTION OF THE INVENTION

According to the present invention a radical-forming compound containing at least three and at most 70 carbon atoms is used with advantage. Preferably the radical-forming compound is amphipolar, which means that it contains at least one nonpolar part and at least one polar part. The nonpolar part is for example a linear carbon chain with between 2 and 24 carbon atoms, or a branched carbon chain with between 3 and 40 carbon atoms. The polar part may be formed by the radical-forming group (or groups) of the radical-forming compound.

Preferably a peroxide, a peroxydicarbonate, a peracid or a diazo compound is used as radical-forming compound.

Examples of such radical-forming compounds are: acetylcyclohexane sulphonyl peroxide, dilauroyl peroxide, didecanoyl peroxide, dioctanoyl peroxide, dipropionyl peroxide, bis(Akypo RLM 45R) peroxide ($[CH_3(CH_2)_{10-12}CH_2(OC_2H_4)_{4,50}CH_2\text{-}COO]_2$), bis(2-methylbenzoyl) peroxide, dibenzoyl peroxide, t-butyl peroxydiethyl acetate, diisopropyl peroxydicarbonate, di(2-ethylhexyl) peroxydicarbonate, di(n-butyl) peroxydicarbonate, di-(sec-butyl) peroxydicarbonate, bis(4-t-butylcyclohexyl) peroxydicarbonate, di(n-propyl) peroxydicarbonate, dilauryl peroxydicarbonate, dicyclohexyl peroxydicarbonate, dimyristyl peroxydicarbonate, dicetyl peroxydicarbonate, peroxyacetic acid, peroxypropionic acid, sodium peroxy benzoate, azoisobutyronitrile and 2,2-azobis(2,4-dimethylvaleronitrile), and dimethoxyisopropyl peroxydicarbonate.

It has been found that if, in addition to the radical-forming group or groups, the radical-forming compound contains at least one other polar group, less radical-forming compound and/or lower concentrations thereof need be used in the solvent to obtain the same adhesion. For this reason these radical-forming compounds are particularly preferred.

The polar group that may be present in addition to the radical-forming group is, for example, a carboxyl, ethercarboxylic acid, amine or alcohol group, an ethoxylated alcohol group or a phenol group.

Examples of these peroxides are:
disuccinoyl peroxide ($[HO_2C\text{—}CH_2\text{-}CH_2\text{—}COO\text{—}]_2$), the peracid of disuccinoyl peroxide, bis(4-carboxylbutyl) peroxide, bis(6-carboxylhexyl) peroxide, bis(8-carboxyloctyl) peroxide, bis(10-carboxyldecyl) peroxide, bis(2-carboxylethyl) peroxydicarbonate, bis(4-carboxylbutyl) peroxydicarbonate, bis(7-carboxylheptyl) peroxydicarbonate, bis(8-carboxyloctyl) peroxydicarbonate, bis(10-carboxyldecyl) peroxydicarbonaat, bis(2-carboxylethyl) peroxydicarbonate, bis(4-carboxylhutyl) peroxydicarbonate, bis(7-carboxylheptyl) peroxydicarbonate, ethoxylated alkanol peroxydicarbonates such as: bis(Alkyporox RC 60$^R$) peroxydicarbonate ($[CH_3\text{-}(CH_2)_6\text{—}CH_2\text{—}(OC_2H_4)_6\text{—}O\text{—}COO\text{—}]_2$), bis-Alkyporox RLM 22$^R$) peroxydicarbonate ($[CH_3\text{-}(CH_2)_{10-12}\text{-}CH_2\text{—}(OC_2H_4)_{2,2}\text{-}O\text{-}COO\text{-}]_2$), bis(Alkyporox RLM 40$^R$) peroxydicarbonate ($[CH_3\text{-}(CH_2)_{10-12}\text{-}CH_2\text{-}(OC_2H_4)_4\text{-}O\text{-}COO\text{-}]_2$), bis(Alkyporox RLM 80$^R$) peroxydicarbonate, ($[CH_3\text{-}(CH_2)_{10-12}\text{-}CH_2\text{-}(OC_2H_4)_8\text{-}O\text{-}COO\text{-}]_2$), bis(Akyporox RO 90$^R$) peroxydicarbonate, ($[CH_3\text{-}(CH_2)_7\text{-}CH=CH\text{—}(CH_2)_7\text{—}CH_2\text{—}(OC_2H_4)_9\text{—}O\text{—}COO\text{—}]_2$)-bis(Akyporox OP 100$^R$) peroxydicarbonate ($[C_8H_{17}\text{-}C_6H_4\text{-}(OC_2H_4)_{10}\text{—}O\text{—}COO\text{—}]_2$), bis(triethoxyheptyl) peroxydicarbonate, bis(hexaethoxydodecyl)) peroxydicarbonate, bis-2(decanoyl-1-(tetraethoxylmethyl)) peroxydicarbonate, di(Dobanoyl 45-7$^R$) peroxydicarbonate ($[CH_3(CH_2)_{12\text{-}13}\text{-}CH_2\text{—}(O\text{—}CH_2\text{—}CH_2)_7\text{—}OCOO]_2$).

The half-life of the radical-forming compound is preferably between 5 minutes and 50 hours at 60° C. and is in particular less than 10 hours at a temperature below 60° C., particularly when a peroxydicarbonate is used.

The polyolefin object and the solution of the radical-forming compound can be contacted by, for example, immersing the polyolefin object in, or passing it through, the solution of the radical-forming compound, by applying the solution of the radical-forming compound with a brush, or by spraying the polyolefin object with the solution of the radical-forming compound.

A great advantage of the process according to the invention is that the treatment may also be effected locally, for example by partial immersion, or by only brushing or spraying the part where adhesion is required without impairing the original properties of the remaining part of the surface.

Various solvents that are known per se may be used as solvent for the radical-forming compound. The choice of solvent is dependent on the solubility and the polarity of the radical-forming compound. Preferably use is made of a polar solvent such as water, lower aliphatic ketones, alkanols or carboxylic esters, such as acetone, methanol, ethanol, ethylacetate, etc.

The concentration of the solution to be used is preferably between 0.1 and 55 wt% of the radical-forming compound, based on the total solution. If a radical-forming compound without at least one other polar group is used, the concentration required will be higher (preferably 15-55 wt%, in particular 20-55 wt%) than when radical-forming compounds with at least one other polar group are used (preferably 0.1-25 wt%, in particular 0.5-25 wt%).

The amount of radical-forming compound used is preferably such that, immediately after it has been wetted, the object contains 0.01-10 mg and in particular 0.1-5 mg of radical-forming compound per m$^2$ of surface area. This amount also depends somewhat on the solubility and the polarity of the compound.

The temperature at which the polyolefin surface is contacted with the solution of the radical-forming compound may vary and depends on the reactivity of the radical-forming compound used. If the stability of the radical-forming compound allows it, ambient temperature is preferably applied. In the case of extremely reactive compounds, such as peroxydicarbonates, a lower temperature is used, for example from −40° C. to 0° C.

The wetted object is subsequently exposed to a temperature of at least 30° C. and preferably at most 160° C., in particular between 50 and 120° C. This can, for example, be effected by heating the object in an oven. This treatment is preferably effected for at least twice the half-life of the radical-forming compound. The optimum time and temperature of the treatment depend on the radical-forming compound used and the polyolefin used. The temperature must remain below the melting temperature of the polyolefin.

Polyolefin objects treated according to the invention can easily be glued, painted, lacquered, coated with ink, or provided with a layer of material that is more polar than the polyolefin, etc. These treatments are known per se. The treated objects appeared to retain their adhesive strength for a long time. Even after storage for more than three months the adhesive strength of the objects treated according to the invention appeared to be hardly less than immediately after treatment.

Polyolefin objects treated according to the invention adhere well to materials with a polar character, such as resins and polyamides. This is of particular importance for example in composites: materials (the so-called matrix) reinforced with other, often fibrous, materials.

When polyolefin filaments are treated according to the invention they become extremely suitable for use as reinforcing material in composites, because the adhesion between the filament and the matrix improves considerably.

These filaments may be incorporated into polymer matrices in a manner known per se, for example by impregnation of fabrics or by winding. (A general survey of techniques commonly applied to this end is given in the 'Handbook of Composites' by Luben, G., published in 1982 by Van Nostrand Reinhold Co. (New York)).

Polyolefin filaments treated according to the invention are particularly suitable for reinforcing polar polymeric materials such as epoxy, phenolic, vinyl ester, polyester, acrylate, cyanoacrylate and polymethyl methacrylate resins and polyamide materials. Preferably an epoxy resin, nylon or an unsaturated polyester is used as matrix.

The composites thus obtained have a wide range of technical applications, for example in boats, surf boards, (glider) aircraft parts, printed circuit boards and car parts, such as bonnets, mudguards, etc.

Highly oriented polyolefin filaments, tapes or films are used with advantage in such applications, in particular highly oriented polyethylene. Using solutions of high-molecular polyolefin as starting material, these can be produced as described in U.S.-A-No.-4,344,908, U.S.-A-No.-4,411,854, U.S.-A-No.-4,422,993, U.S.-A-No.-4,430,383 and U.S.-A-No.-4,436,689. In these processes a solution or melt of a linear polyolefin with a weight average molecular weight of at least $4 \times 10^5$ g/mol is spun or extruded, the object obtained after spinning or extrusion is converted into a gel object by cooling, and this gel object is stretched at increased temperature.

In particular, highly oriented polyolefin (polyethylene) filaments which have been obtained by ultradrawing gel filaments (draw ratio more than 20) and which have an extremely high tensile strength, for example in the case of polyethylene more than 2 GPa, and an extremely high modulus, for example more than 50 GPa, are used as polyolefin objects.

As high-molecular linear polyolefin polyethylene with a weight average molecular weight of at least $4 \times 10^5$ g/mol, especially of at least $8 \times 10^5$ g/mol, is preferably used which may contain minor amounts, preferably at most 5 mol.%, of one or more other alkenes copolymerised with it, such as propylene, butene, pentene, hexene, 4-methylpentene, octene, etc., with the polymer chains consisting of unbranched chains of at least 100 carbon atoms, preferably at least 300 carbon atoms, between carbon atoms with side chains of more than 1 C atom. The polyethylene may contain minor amounts, preferably at most 25 wt% based on the total polymer, of one or more other polymers, in particular an alkene-1-polymer such as polypropylene, polybutene or a copolymer of propylene with a minor amount of ethylene. In addition, a polypropylene or ethylene-propylene copolymer may be used as highmolecular linear polyolefin.

The invention will now be elucidated with some examples, without, however, being limited thereto.

EXAMPLES

EXAMPLE 1.

Yarns of high molecular polyethylene monofilaments (Mw =1,5×10⁶), prepared according to example 1 of U.S.-A-No.-4,422,993 were immersed for 30 s at −20° C. in different peroxyde solutions (obtained from AKZO Chemie B.V.). After exposure to a temperature of 60° C. for 20 min., then to 70° C. for 40 min. and finally to 80° C. for 20 min., the yarns were embedded in epoxy resin (as in example A of EP-A-198,565). After curing of the product, the ILSS (=Interlaminate Shear Strength) was measured according to ASTM D 2344. The results are presented in table I.

TABLE I

| peroxyde | solvent | concentration (g/l) | ILSS (N/mm²) |
| --- | --- | --- | --- |
| Perkadox IPP | 2-propanol | 400 | 23 ± 2 |
| Trigonox EHP | ethanol | 160 | 17 ± 2 |
| Trigonox EHP | ethanol | 210 | 19 ± 2 |
| Trigonox EHP | ethanol | 260 | 22 ± 2 |

Perkadox IPP ® is a registered tradename for di-isopropylperoxydicarbonate; Trigonox EHP ® is a registered tradename for bis(2-ethylhexyl)peroxydicarbonate.

The tensile strength and Young's Modulus of the treated filaments was more than 90% of the tensile strength and Young's Modulus of the untreated filaments. Untreated yarns gave an ILSS of 6±1 N/mm².

EXAMPLE 2

Yarns of polyethylene monofilaments as described in example 1 were immersed at room temperature for 30 s in a saturated solution of disuccinoylperoxyde in ethanol, the yarns were subjected to a temperature of 110° C. for 2,5 hours and embedded in an epoxy resin, as in example I. The fixing strength of the epoxy resin ('pull-out' force) to the yarns was determined using a drawbench and expressed in N. A 'pull out' force of 142±6N was measured. The tensile strength and Young's Modulus of the treated filaments was more than 90% of the tensile strength and Young's Modulus of the untreated filaments.

Untreated yarns showed a 'pull out' force of 20±4N.

We claim:

1. Process for the treatment of surfaces of highly oriented polyolfein objects, comprising the steps of converting a solution or melt of a linear polyolefin with a weight average molecular weight of at least 400,000 g/mol, at a temperature above the dissolution temperature of said solution, or above the melting temperature of said melt, into a shaped object, converting this object into a gel-object by cooling, and stretching the gel-object at elevated temperature after removal of the solvent, wherein the surface of the object is contacted with a solution of a radical-forming compound and that the object is then exposed to a temperature of at least 30° C. for at least 1 minute.

2. Process according to claim 1, wherein the radical-forming compound contains a noppolar part with a carbon chain of at least 2 and at most 40 Carbon-atoms.

3. Process according to claim 1, wherein the radical-forming compound is a peroxide, a peroxydicarbonate, a peracid or a diazo compound.

4. Process according to claim 2 wherein in addition to the radical-forming group, the radical-forming compound contains at least one other polar group.

5. Process according to claim 1 wherein the radical-forming compound has a half-life of at most 50 hours at 60° C.

6. Process according to claim 5, wherein a peroxydicarbonate with a half-life of at most 10 hours at a temperature of 60° C. is used as a radical-forming compound.

7. Process according to claim 1 wherein a solution containing 0.1–55 wt% of a radical-forming compound, based on the total weight of the solution, is used.

8. Process according to claim 1 wherein a polar solvent is used as solvent.

9. Process according to claim 8, wherein water, a lower aliphatic ketone, alcohol or carboxylic ester is used as a polar solvent.

10. Process according to claim 9 wherein the polyolefin object is contacted with such an amount of the radical-forming compound that 0.01–10 mg of radical-forming compound per m² of surface area is applied to the object.

11. Process according to claim 1 wherein the object is exposed to a temperature of 30°–160° C.

12. Process according to claim 1 wherein a polyolefin filament, tape or film is used as polyolefin object.

13. Process according to claim 1 wherein the polyolefin object is a polyethylene filament, obtained by ultra-stretching of gel-filaments spun from a solution, having a tensile strength of more than 2 GPa and a modulus of more than 50 GPa.

14. Process according to claim 1, wherein after the surface of the polyolefin object is contacted with the solution of a radical forming compound the polyolefin object is subjected to an electron irradiation treatment, before, during or after the heating treatment.

* * * * *